(12) United States Patent
Akiba et al.

(10) Patent No.: US 6,721,300 B1
(45) Date of Patent: Apr. 13, 2004

(54) STTD ENCODING METHOD AND DIVERSITY TRANSMITTER

(75) Inventors: Toru Akiba, Yokosuka (JP); Daisuke Yamada, Yokohama (JP)

(73) Assignee: Matsushita Electric Industrial Co., LTD, Osaka (JP)

(*) Notice: Subject to any disclaimer, the term of this patent is extended or adjusted under 35 U.S.C. 154(b) by 779 days.

(21) Appl. No.: 09/648,803

(22) Filed: Aug. 28, 2000

(30) Foreign Application Priority Data

Mar. 22, 2000 (JP) ........................................ 2000-080384

(51) Int. Cl.[7] .............................................. H04B 7/216
(52) U.S. Cl. ........................ 370/342; 370/500; 370/335; 375/343; 375/347
(58) Field of Search ................................. 370/320, 335, 370/342, 500; 375/130, 135, 156, 142, 143, 145, 146, 147, 149, 150, 267, 295, 316, 343, 347

(56) References Cited

U.S. PATENT DOCUMENTS 6,424,679 B1 * 7/2002 Dabak et al. ............... 375/267
6,449,314 B1 * 9/2002 Dabak et al. ............... 375/267
2002/0018529 A1 * 2/2002 Dabak et al. ............... 375/267
2002/0118727 A1 * 8/2002 Kim et al. ................... 375/146

OTHER PUBLICATIONS

Technical Specification "3G TS 25.211 V3.1.1" (1999–12, p. 15–21).
Technical Specification "3G TS 25.211 V2.4.0" (1999–9, p. 1–35) specified by the 3GPP (3rd Generation Partnership Project).

* cited by examiner

*Primary Examiner*—Wellington Chin
*Assistant Examiner*—Mark Mais
(74) *Attorney, Agent, or Firm*—Stevens, Davis, Miller & Mosher, LLP.

(57) ABSTRACT

STTD encoding is signal processing carried out when a base station performs diversity transmission in open-loop mode to a mobile station. The STTD encoding method according to the present invention applies reverse STTD encoding on a pilot signal that should not be subjected to STTD encoding beforehand. Then, the multiplexer time-multiplexes the pilot signal with transmission data and control data to compose a transmission frame. Then, all data included in the transmission frame is subjected to STTD encoding. Applying reverse encoding before frame composition eliminates the need for distinguishing data to be encoded from data not to be encoded during STTD encoding.

10 Claims, 8 Drawing Sheets

STTD ENCODING METHOD AND DIVERSITY TRANSMITTER

BACKGROUND OF THE INVENTION

Field of the Invention

The present invention relates to an STTD encoding method and a diversity transmitter.

Description of the Related Art

STTD (Space time block coding based transmit antenna diversity) is signal processing optionally adopted by a base station in a CDMA communication system when sending information pertinent to a Downlink Dedicated Physical Channel (Downlink DPCH) to a mobile station in open-loop mode.

According to the third-generation cellular telephone global standard system IMT2000 (International mobile telecommunication 2000) technical specification, a transmitter at the base station is required to have a function of carrying out STTD encoding.

The STTD encoding function is explained on page 15 (5.3 Downlink physical channels) of the technical specification (3G TS 25.211 V3.1.1 (1999-12)) specified by the 3GPP (3rd Generation Partnership Project).

As described above, STTD encoding is performed when a base station performs diversity transmission to a mobile station in open-loop mode.

The base station carries out transmission, for example using two transmission antennas. At this time, from one antenna data is transmitted with predetermined encoding carried out. From the other antenna, data is transmitted without encoding.

As an example, suppose a case where symbol S1 is sent immediately followed by S2.

From one antenna, data S1 and S2 are directly transmitted.

From the other antenna, data is sent with the polarity of the imaginary part of a transmission symbol reversed and positions of adjacent transmission symbols switched round. That is, S3 (=−S2*) and S4 (=S1*) are sent. Here, asterisk "*" means a relationship between conjugate complex numbers.

The mobile station (receiving side) receives a signal transmitted by one antenna (or a plurality of antennas). The voltage level of a reception signal fluctuates under the influence of fading.

A signal sent from one antenna of the base station (that is, signal whose symbol to be sent is sent as it is) and a transmission signal sent from the other antenna (that is, signal sent with the polarity of the imaginary part of the transmission symbol reversed and positions of adjacent transmission symbols switched round) have different fading modes.

Furthermore, by adding predetermined decoding processing to the reception signal, it is possible to distinguish whether the reception signal is sent from one antenna of the base station or from the other antenna.

Therefore, the mobile station can select a reception signal with greater signal amplitude or combine both reception signals to compensate the reduced amplitude of the reception signals caused by fading.

That is, the receiving side can substantially perform diversity reception even if it has only one antenna.

STTD encoding should not be carried out for a pilot symbol.

This is because a pilot signal is necessary on the receiving side to acquire reception synchronization and encoding the pilot signal itself would make this initial synchronization acquisition difficult.

Therefore, it is necessary to perform STTD encoding on all symbols other than the pilot symbol.

A system configuration to perform STTD encoding is described in FIG. 8 on page 15 of the technical specification (3GPP TS 25.211 V2.4.0 (1999-09)).

FIG. 8 shows the configuration (details of FIG. 8 will be described later).

The system shown in the technical specification divides composition of a transmission frame into two stages.

That is, in the first stage, the system multiplexes data on which STTD encoding should be performed and applies STTD encoding to the multiplexed data.

Then, in the second stage, data not to be subjected to STTD encoding (that is a pilot signal) is multiplexed with the data subjected to STTD encoding. This completes composition of one frame.

However, a system carrying out such processing has a frame composition process divided into two stages. Thus, two multiplexers are required for data multiplexing, which will increase the size of the circuit.

Furthermore, frame composition requires strict timing control. Especially using two multiplexers requires accurate timing control, which will constitute a considerable restriction on the system design of the base station.

For example, it is mandatory that two multiplexers and STTD encoder be placed close to each other. This reduces the degree of freedom of the design of a system board and the degree of freedom of the location of each system board.

Here, it is also possible to conceive another configuration using one multiplexer and distinguishing input data to be subjected to STTD encoding from input data not to be subjected to STTD encoding inside the multiplexer.

However, this again requires a configuration for distinguishing input data and performing encoding on only data requiring STTD encoding, which will increase the size of the circuit.

This will also require strict timing control to multiplex data not to be subjected to STTD encoding with data subjected to STTD encoding, which will complicate the circuit. Moreover, strict timing control will constitute a considerable restriction on the system design.

The present invention has been implemented to solve these problems and it is an object of the present invention to reduce the size of the circuit of a system carrying out STTD encoding and avoid any considerable restriction from being imposed on the system design.

SUMMARY OF THE INVENTION

The present invention applies reverse STTD encoding to a data part not to be subjected to STTD encoding beforehand.

Then, symbols subjected to reverse STTD encoding are multiplexed with other symbols to be subjected to STTD encoding using a multiplexer to compose a frame.

Then, STTD encoding is carried out on all data included in the composed frame.

As a result, the data subjected to reverse STTD encoding is restored to a state of data not subjected to STTD encoding.

Using such a method eliminates the need to distinguish between data to be encoded and data not to be encoded inside the STTD encoder. Moreover, just one multiplexer will suffice.

Reverse STTD encoding follows the principle, which is totally reverse to that of STTD encoding.

Suppose there are two adjacent QPSK symbols, S1 and S2. Applying reverse STTD encoding results in symbols S1 and S2 being directly output as signals corresponding to one transmission antenna. Moreover, S3 and S4 are generated and output as signals corresponding to the other transmission antenna which have a relationship of S3=S2* and S4=−S1* (here, "*" denotes a relationship between conjugate complex numbers).

The present invention contributes to simplification of the configuration of a base station system (transmission system) in a mobile communication.

Furthermore, even if the mobile station (receiving side) has only a single antenna, performing diversity transmission using STTD encoding allows the mobile station to actually carry out diversity reception, which will improve the quality of a reception signal.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, an embodiment of the present invention will be explained in detail below.

Figure 1:
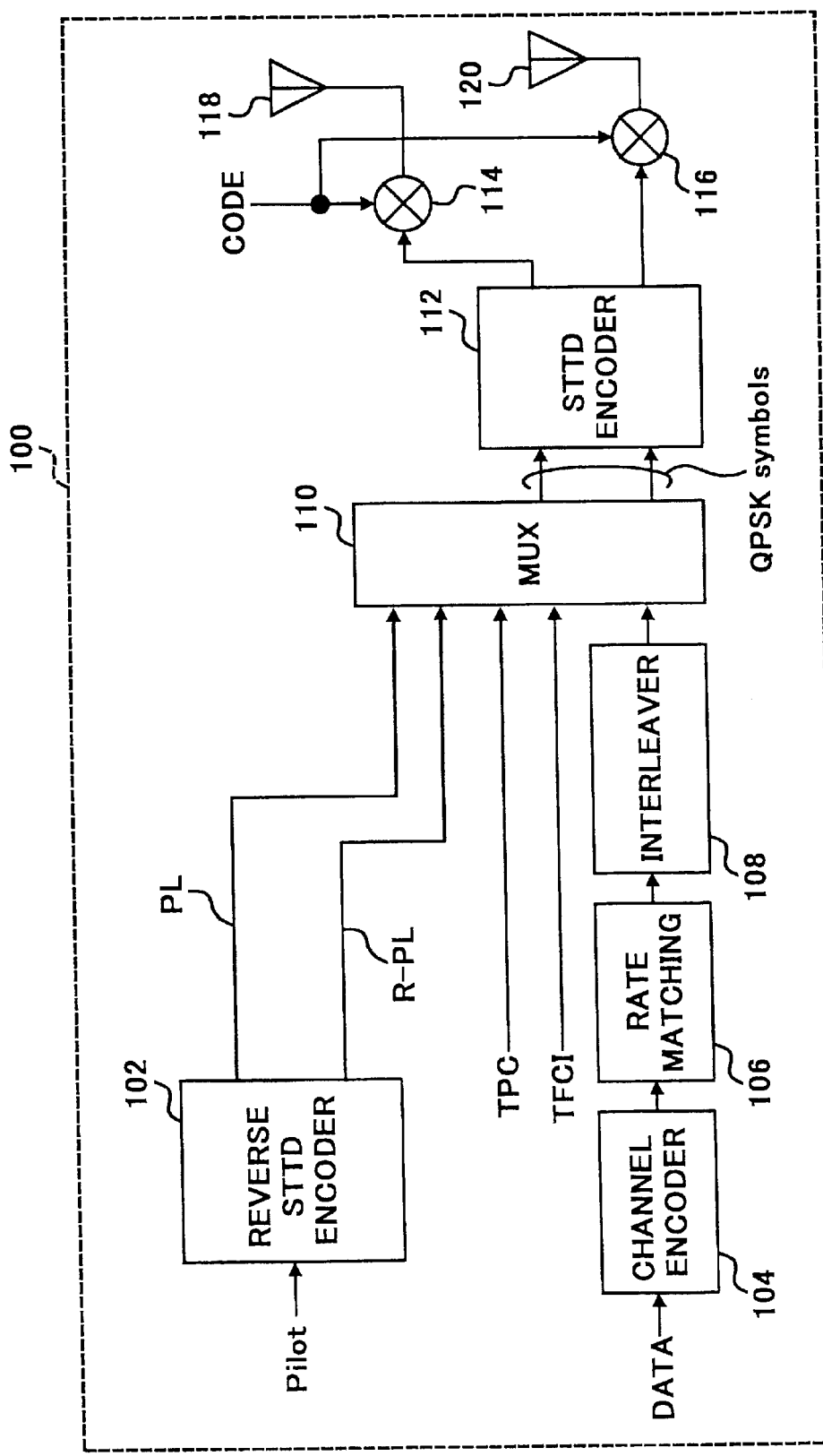
FIG. 1 is a block diagram showing a configuration of a base station system (transmission system) according to an embodiment of the present invention.

FIG. 1 illustrates a configuration of a base station system in a CDMA communication according to an embodiment of the present invention.

As shown in the figure, base station system (transmitter) 100 comprises channel encoder 104, rate matching circuit 106, interleaver 108, reverse STTD encoder 102, multiplexer 110, STTD encoder 112, code multipliers 114 and 116 and two antennas 118 and 120.

Two antennas 118 and 120 are placed apart by a predetermined distance from one another.

Code multipliers 114 and 116 multiply transmission data by various spreading codes such as a channelizing code and scrambling code. Signals are transmitted from two antennas 118 and 120 with same power, for example.

A feature of this embodiment is perform reverse STTD conversion on a pilot signal, which should not be subjected to STTD encoding, and then compose a transmission frame.

STTD encoding is carried out on all composed transmission frames.

Figure 7:
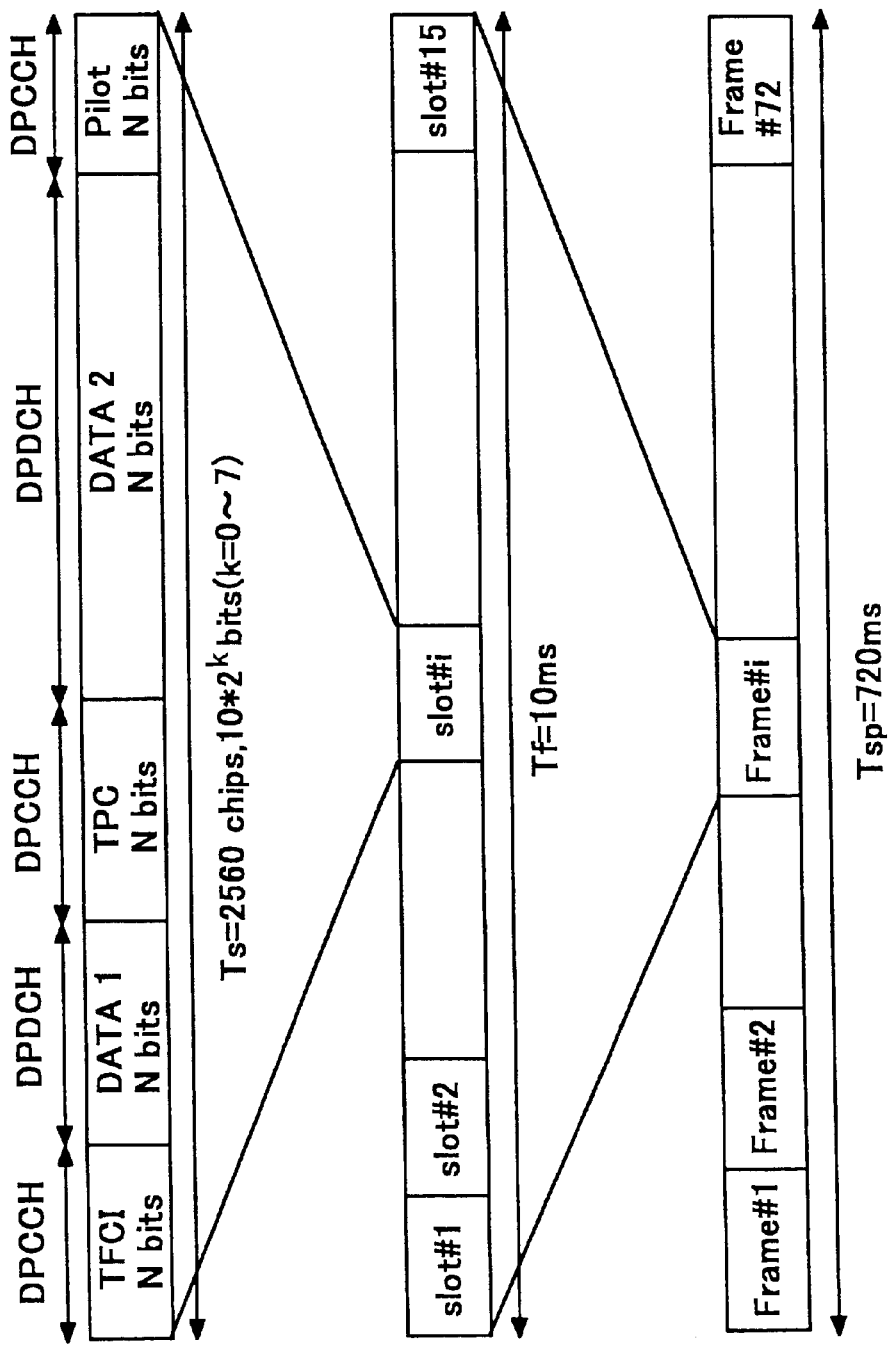
FIG. 7 illustrates a configuration of a downlink physical channel specified by the IMT2000 technical specification.

Multiplexer 110 in FIG. 1 performs time-multiplexing on a plurality of types of information input in predetermined order and constructs frames of downlink physical channels as shown in FIG. 7.

As shown in FIG. 7, one super flame consists of 72 frames. One frame consists of 15 slots. One slot consists of 2560 chips.

Information contained in one slot is classified into a dedicated physical control channel (DPCCH) and dedicated physical data channel (DPDCH).

Transformat combination information (TFCI) is information on a transmission format. From this TFCI it is possible to distinguish the type of transmission data whether it is voice data or non-voice data (for example, image data), for example.

Moreover, when sending non-voice data, etc. simultaneously using a plurality of channels, it is possible to know the attribute of the transmission data from TFCI.

A transmit power control command (TPC) is information for transmit power control.

A pilot signal (Pilot) is a signal used to acquire synchronization on the receiving side. Transmission data (Data 1 and Data 2) is data made up of QPSK symbols (2 bits).

Here, QPSK modulation is performed on the pilot signal (Pilot), transformat combination information (TFCI) and transmit power control command (TPC) likewise.

In FIG. 1, channel encoder 104 adds an error correction code to the transmission data. Rate matching circuit 106 adjusts so that the number of bits of data matches a predetermined number of bits.

Interleaver 108 performs interleaving processing on data to prevent burst errors from occurring on the receiving side.

When a pilot symbol is input, reverse STTD encoder 102 outputs two signals. One is a signal to be transmitted from antenna 118. This signal is marked "PL" in FIG. 1. This "PL" is the pilot symbol input and then output as it is.

The other signal output from the reverse STTD encoder is a signal to be transmitted from antenna 120 and marked "R-PL" in FIG. 1. "Reverse conversion" is performed on this "R-PL".

That is, if the pilot symbols input are S1 and S2, symbols (PL) after reverse conversion are S2* and −S1*.

Here, "*" denotes a relationship between conjugate complex numbers. That is, "reverse conversion" is processing of finding conjugate complex numbers of input data for two input symbols, rearranging the order of transmission of symbols and multiplying the second symbol by "−1".

Figure 2A:
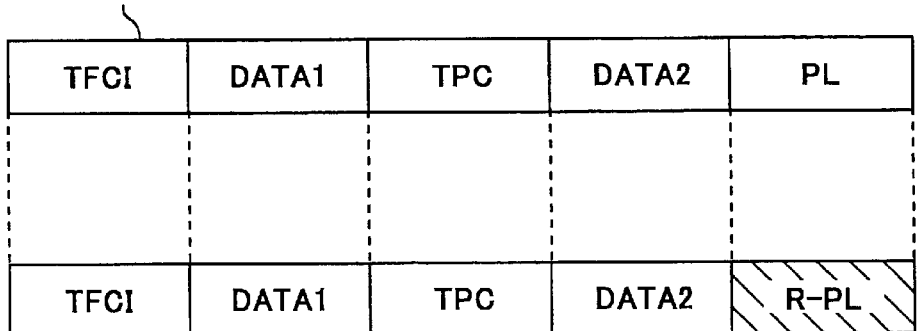
FIG. 2A illustrates a data content included in one slot input to the STTD encoder in FIG. 1.

Multiplexer 110 time-multiplexes the pilot signal output from reverse STTD encoder 102 with TPC, TFCI and transmission data to construct slots as shown in FIG. 2A.

The slots shown in the upper row in FIG. 2A are transmission slots corresponding to antenna 118 and the slots shown in the lower row are transmission slots corresponding to antenna 120. A pilot symbol in the lower row is expressed with hatching.

This indicates that this is a symbol (R-PL) subjected to reverse conversion by reverse STTD encoder 102.

STTD encoder 112 performs encoding processing on all data output from multiplexer 110. Then, two lines of transmission signal are output as shown in FIG. 2B.

Figure 2B:
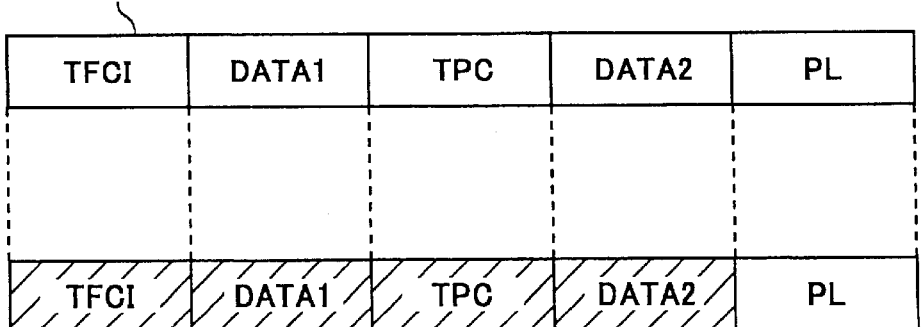
FIG. 2B illustrates a data content included in one slot output from the STTD encoder in FIG. 1.

The slots shown in the upper row in FIG. 2B are transmission slots corresponding to antenna 118 and the slots shown in the lower row are transmission slots corresponding to antenna 120.

The transmission slots corresponding to antenna 118 are composed by directly multiplexing the pilot signal (PL) not subjected to reverse conversion with TFCI, TPC, DATA1 and DATA2.

On the other hand, the transmission slots corresponding to antenna 120 are subjected to encoding processing (forward conversion) by STTD encoder 112. If the input pilot symbols are S1 and S2, the symbols after forward conversion are −S2* and S1*. Here, "*" denotes a conjugate complex number.

That is, "forward conversion" refers to processing of finding conjugate complex numbers of input data for two input symbols, switching round the order of symbol transmission and multiplying the symbol to be transmitted first by "−1".

TFCI, TPC, DATA1 and DATA2 composing the transmission slots in the lower row in FIG. 2B are expressed with hatching.

This indicates that these are data subjected to normal "forward conversion".

On the other hand, if a pilot signal already subjected to reverse conversion (R-PL) is subjected to forward conversion, a pilot signal (PL) before reverse conversion is obtained. This is equivalent to entering a pilot signal (PL) into the STTD encoder and outputting the pilot signal (PL) without performing any processing. That is, the pilot signal remains in much the same way as it is not subjected to STTD encoding.

As shown above, the present invention performs reverse STTD encoding on the part not to be subjected to STTD encoding beforehand.

Then, the multiplexer multiplexes symbols subjected to reverse STTD encoding with other symbols to be subjected to STTD encoding to compose a frame.

Then, all data included in the composed frame is subjected to STTD encoding.

As shown above, the present invention performs reverse STTD encoding on data not requiring STTD encoding before composing transmission frames and then composes a transmission frame.

Using such a method eliminates the need to distinguish between data to be encoded and data not to be encoded inside the STTD encoder. Moreover, just one multiplexer will suffice.

Hereinafter, advantages of the system of this embodiment will be explained in comparison with a comparison example.

Figure 8:
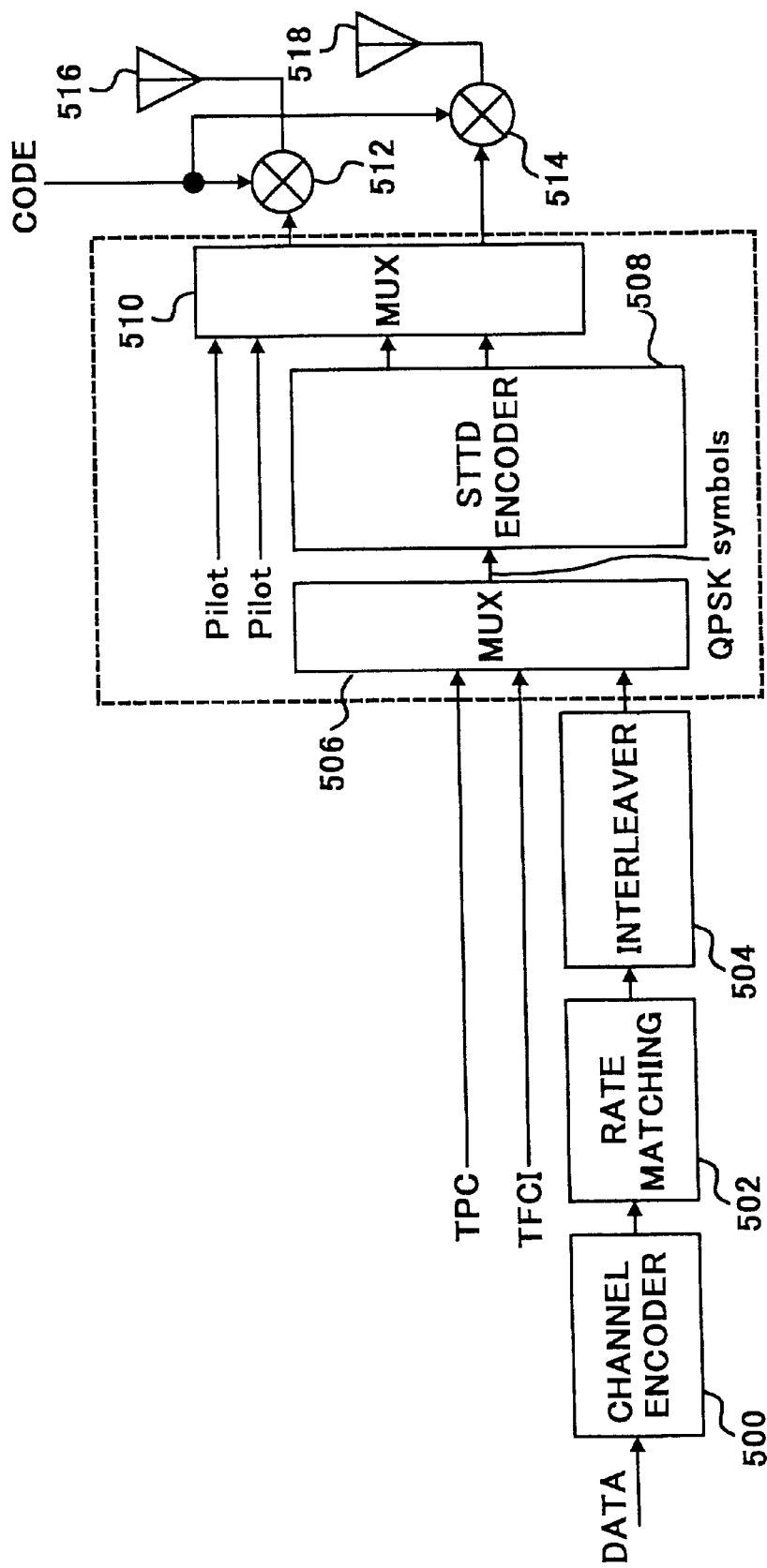
FIG. 8 is a block diagram showing a system carrying out STTD encoding described on page 15 (5.3 Downlink physical channels) of the IMT2000 technical specification (3G TS 25.211 V3.1.1 (1999-12)).

FIG. 8 shows a configuration of a system (comparison example) to be subjected to STTD encoding shown on page 15 of the technical specification (3GPP TS 25.211 V2.4.0 (1999-09)) of the 3GPP (3rd generation partnership project). The configuration in FIG. 8 uses two multiplexers 506 and 510.

First multiplexer 506 multiplexes TPC, TFCI and transmission data (DATA). Then, STTD encoder 508 carries out STTD encoding processing on the multiplexed signal.

Then, second multiplexer 510 adds a pilot signal (Pilot).

However, the system with the configuration shown in FIG. 8 needs two multiplexers to multiplex data, which increases the size of the circuit.

On the other hand, frame composition requires strict timing control. Using two multiplexers requires accurate timing control in particular, which constitutes a considerable restriction on the design of the base station system.

For example, it is mandatory that two multiplexers 506 and 510 and STTD encoder 508 (the section enclosed by dotted line in FIG. 8) be placed close to each other.

This reduces the degree of freedom of the design of a system board and the degree of freedom of the location of each system board.

Here, there can also be another configuration (other comparison example) using one multiplexer in which a distinction is made between input data to be subjected to STTD encoding and input data not to be subjected to STTD encoding.

However, this again requires a configuration to distinguish input data and perform encoding on only data requiring STTD encoding, which will increase the size of the circuit.

This also requires strict timing control to multiplex data not to be subjected to STTD encoding with data subjected to STTD encoding, which will complicate the circuit. Moreover, strict timing control constitutes a considerable restriction on the system design.

In contrast, the configuration of the present invention (FIG. 1) eliminates the need to distinguish data to be encoded from data not to be encoded inside the STTD encoder. Moreover, just one multiplexer will suffice. Thus, the circuit for the STTD encoding system can be simplified.

This makes it possible to reduce the size of the circuit and avoid considerable restrictions on the system design from being imposed.

Next, STTD encoding and reverse STTD encoding will be explained more specifically. First, STTD encoding will be explained.

Figure 6A:
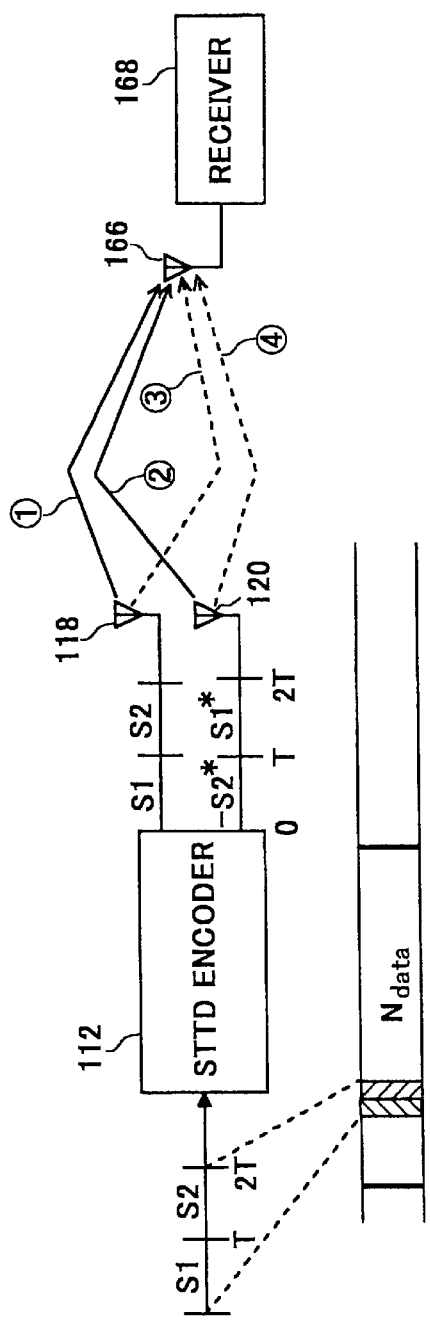
FIG. 6A illustrates a content of STTD encoding and a path of a transmission signal.

As shown in FIG. 6A, symbols S1 and S2 are input to STTD encoder 112 consecutively. T and 2T in the figure each indicate a lapse of time.

STTD encoder 112 outputs transmission symbols for antenna 118 and transmission symbols for antenna 120 in parallel.

Transmission symbols for antenna 118 are "S1, S2" and these are completely the same as the symbols input.

On the other hand, transmission symbols for antenna 120 are "−S2*, S1*". Here, "*" denotes a conjugate complex number.

That is, transmission symbols for antenna 118 are obtained by finding conjugate complex numbers of input data for two input symbols, changing the transmission order of symbols and multiplying the first symbol to be transmitted by "−1".

Figure 6B:
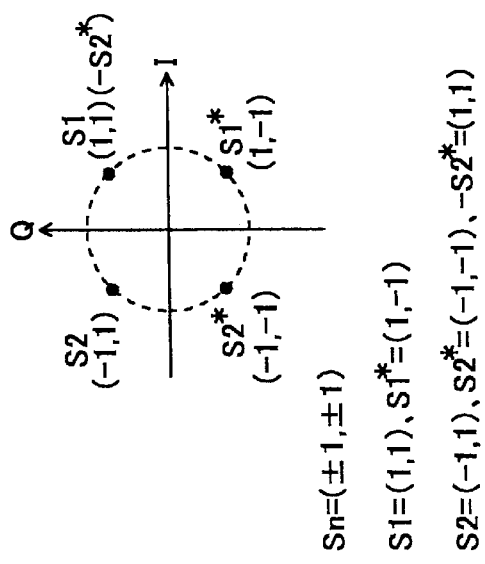
FIG. 6B illustrates position examples on a phase plane of QPSK symbols before STTD encoding and QPSK symbols after STTD encoding.

As shown in FIG. 6B, a quadri-phase shift keying symbol (QPSK symbol) consists of 2-bit data indicating a position on the phase plane (I, Q plane). The first bit indicates an I component and the second data indicates a Q component. The I component and Q component correspond to the real part and imaginary part of a complex envelope of a modulated wave, respectively.

If a QPSK symbol is expressed by Sn, symbol Sn consists of 2-bit data each bit corresponding to the real part and imaginary part. Each bit can take either "+1" or "−1".

That is, Sn=(±1, ±1). In the following explanation, suppose S1=(1, 1) and S2=(−1, 1), for example.

Then, S1*=(1, −1) and −S2*=S1*=(1, −1).

As shown in FIG. 6A, a signal transmitted from antenna 118 travels through path ① and path ③ and arrives at one antenna 166 of receiver (mobile station) 168.

On the other hand, a signal transmitted from antenna 120 travels through path ② and path ④ and arrives at one antenna 166 of receiver (mobile station) 168.

Figure 6C:
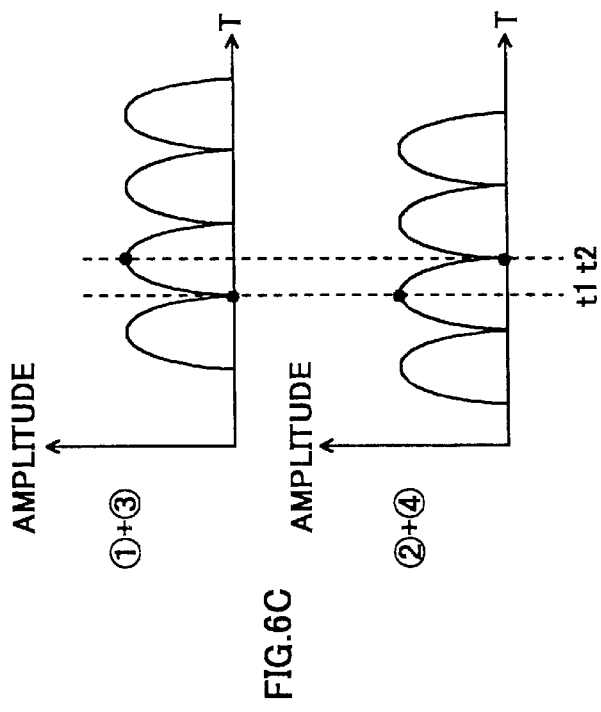
FIG. 6C is a drawing to explain an effect of STTD encoding.

As shown in FIG. 6C, the reception signal that combines the signal passing through path ① and signal passing through path ③ differs from the reception signal that combines the signal passing through path ② and signal passing through path ④ in the fading situation.

That is, the probability that both reception signals coincide with one another in their peaks and valleys is low. In FIG. 6C, both reception signals have different amplitudes at time t1 and time t2.

Furthermore, receiver 168 can distinguish whether a signal wave received is sent from antenna 118 or antenna 120 by carrying out predetermined decoding processing on the reception signal.

Thus, it is possible to improve the quality of a reception signal by selecting a reception signal of larger amplitude or combining reception signals.

Thus, receiver (mobile station) 168 can improve the reception quality even if it owns only one antenna 166 in the same way as when diversity reception is carried out.

Then, reverse STTD encoding will be explained.

Suppose transmission symbols are S1 and S2. Here, suppose S1=(1, 1) and S2=(−1, 1).

If symbols S1 and S2 are subjected to revere STTD encoding, two lines of symbols are output. That is, as the symbols corresponding to antenna 118, the same input symbols S1 and S2 are output.

On the other hand, as the symbols corresponding to antenna 120, S3 and S4, which have a relationship of S3=S2* and S4=−S1*.

In this specification, the operation to find symbols S3 and S4 is called "reverse conversion" in reverse STTD encoding. This is the content of reverse STTD encoding.

Then, S2*=(−1, −1) and −S1*=−(1, −1)=(−1, −1).

Carrying out STTD encoding on each of symbols "S2*" and "−S1*" obtained by reverse STTD encoding obtains symbols "S1" and "S2" before being subjected to STTD encoding.

Hereinafter, a more detailed explanation will be given using FIG. 3.

Figure 3:
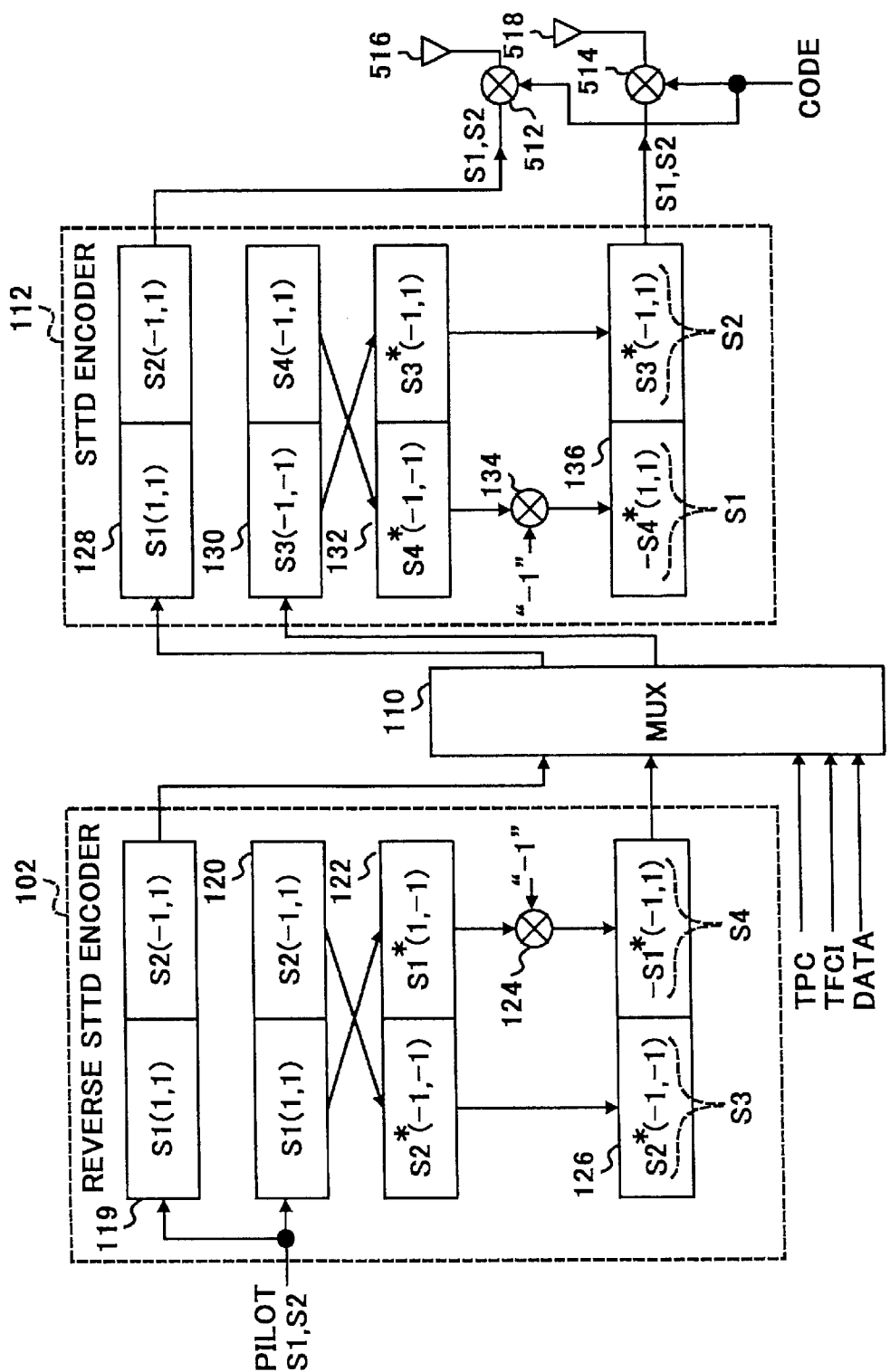
FIG. 3 illustrates a basic configuration and data processing procedure of the reverse STTD encoder and STTD encoder in FIG. 1.

FIG. 3 is a drawing to explain a basic configuration of the reverse STTD encoder and STTD encoder.

Pilot symbols S1 and S2 are input to reverse STTD encoder 102. Here, S1=(1, 1) and S2=(−1, 1).

Notation S1(1, 1) means that two bits of data composing QPSK symbol S1 are "1" and "1".

Input pilot symbols S1 and S2 are stored temporary storage circuits 118 and 120 as shift registers.

Pilot symbols S1 and S2 stored in temporary storage circuit 119 are symbols corresponding to antenna 118 and output as they are.

Pilot symbols S1 and S2 stored in temporary storage circuit 121 are symbols corresponding to antenna 120 and are subjected to the following processing:

First, the polarity of the imaginary part of each symbol is reversed and the position of each symbol is changed and these symbols are stored in temporary storage circuit 122.

Of the two symbols stored in temporary storage circuit 122, the right side symbol (S1*) is multiplied by "−1" using multiplier 124.

Then, the symbol is stored in temporary storage circuit 126. This is symbol "S4 (=−S1*) for antenna 120 obtained as a result of reverse STTD encoding of symbol "S2".

On the other hand, of the symbols stored in temporary storage circuit 122, the left side symbol (S2*) is directly moved to temporary storage circuit 126. This is symbol "S3 (=S2*) for antenna 120 obtained as a result of the reverse STTD encoding of symbol "S1".

Then, the symbol data (S1, S2 and S3, S4) stored in temporary storage circuits 119 and 126 are output at same timing.

As explained using FIG. 1, the pilot symbol subjected to reverse STTD encoding is time-multiplexed with TPC information, TFCI information and transmission data by multiplexer 110.

Then, STTD encoder 112 performs STTD encoding.

Next, a more specific explanation of STTD encoding will be given.

A basic configuration of STTD encoder 112 is shown on the right side of FIG. 3. The figure only shows pilot symbols.

Pilot symbols S1 (=(1, 1), S2 (=(−1, 1)) are stored in temporary storage circuit 128.

These symbols S1 and S2 are symbols to be transmitted from antenna 118. These symbols S1 and S2 are output as they are.

On the other hand, pilot symbols S3 (=(1, −1)), S4 (=(1, −1)) are stored in temporary storage circuit 130.

These symbols S3 and S4 are symbols to be transmitted from antenna 120. The following processing is performed on these symbols S3 and S4.

The processing explained below is called "forward conversion" of STTD encoding in this specification. "Forward conversion" is the processing totally opposite to "reverse conversion" of reverse STTD encoder.

First, the polarity of the imaginary part of each symbol is reversed and the position of each symbol is changed and these symbols (S4*, S3*) are stored in temporary storage circuit 132.

Then, of the symbols stored in temporary storage circuit 132, the left side symbol (S4*) is multiplied by "−1" using multiplier 134.

Then, the symbol is stored in temporary storage circuit 136. This is symbol "−S4* for antenna 120 obtained as a result of the reverse STTD encoding of symbol "S3".

Then, this −S4* (=(1, 1)) is the same as the value of symbol "S1" before performing reverse STTD encoding.

On the other hand, of the symbols stored in temporary storage circuit 132, the right side symbol (S3*) is moved to temporary storage circuit 136. This is symbol "S3*" for antenna 120 obtained as a result of the STTD encoding of symbol "S4".

Then, S3* (=(−1, 1)) is the same as symbol "S2" before reverse STTD encoding.

In this way, if reverse STTD encoding is applied to a pilot symbol beforehand, it is possible to obtain a pilot signal without STTD encoding after STTD encoding.

Then, as is clear from FIG. 3, the configuration for performing each STTD encoding and reverse STTD encoding can be implemented using a simple circuit using a temporary storage circuit and a multiplier of "−1". Furthermore, it can be simply processed by software.

Figure 4A:
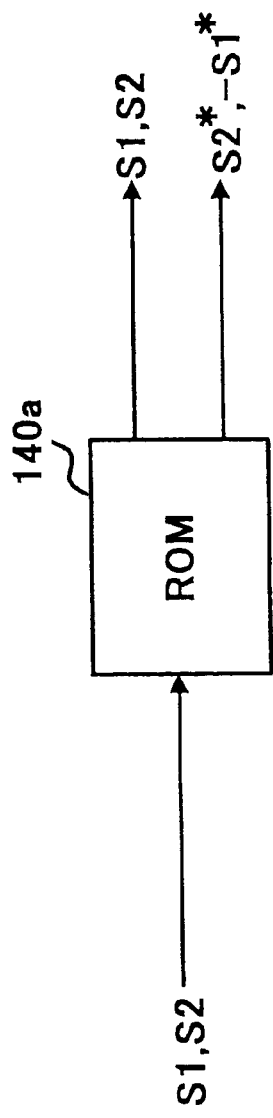
FIG. 4A is a block diagram showing a configuration example of a reverse STTD encoder of the present invention.
Figure 4B:
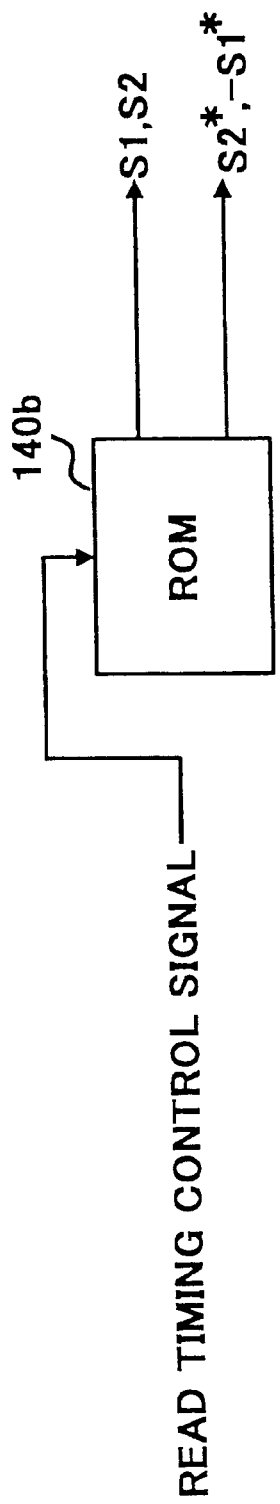
FIG. 4B is a block diagram showing another configuration example of a reverse STTD encoder of the present invention.

Furthermore, the reverse STTD encoder can also be configured by ROM as shown in FIG. 4A and FIG. 4B. That is, it is possible to create necessary data using a lookup table system.

In FIG. 4A, data after reverse STTD encoding is stored in ROM 140a.

That is, ROM 140a stores the same data (S1, S2) as the data input and data (S3=S2*, S4=−S1*) obtained by applying "reverse conversion" to data S1 and S2 at the same address.

Then, ROM 140a is accessed using the 2-bit data of the input symbols (S1, S2) as address variables (information to specify the ROM address) to output the corresponding data.

The data read-timing for ROM 140b shown in FIG. 4B is controlled by a read timing control signal supplied from outside.

Pilot signal patterns (data array) used in a CDMA communication is predetermined. Therefore, data is stored in ROM 140b in the sequence of the data array of the pilot signal.

That is, data (S1, S2 . . . ) itself composing a pilot signal and data (S3=S2*, S4=−S1* . . . ) resulting from applying reverse conversion to the data (S1, S2 . . . ) are stored sequentially.

Then, if read timing is given by a read timing control signal, read addresses are sequentially updated inside ROM 140b. This allows the storage data to be output sequentially.

Such a data creation method using memory (lookup table system) is also applicable to STTD encoding.

As shown above, the system of the present invention in FIG. 1 has a simple circuit configuration. This can by far reduce the size of the circuit compared with the system in FIG. 8.

Furthermore, in the system in FIG. 1, frame composition is already completed before data is input to STTD encoder 112.

That is, STTD encoder 112 has nothing to do with the frame composition processing. This gives freedom of constructing multiplexer 110 and STTD encoder 112 on different boards.

This simplifies the design of the base station system and improves the efficiency of constructing the base station system.

Figure 5:
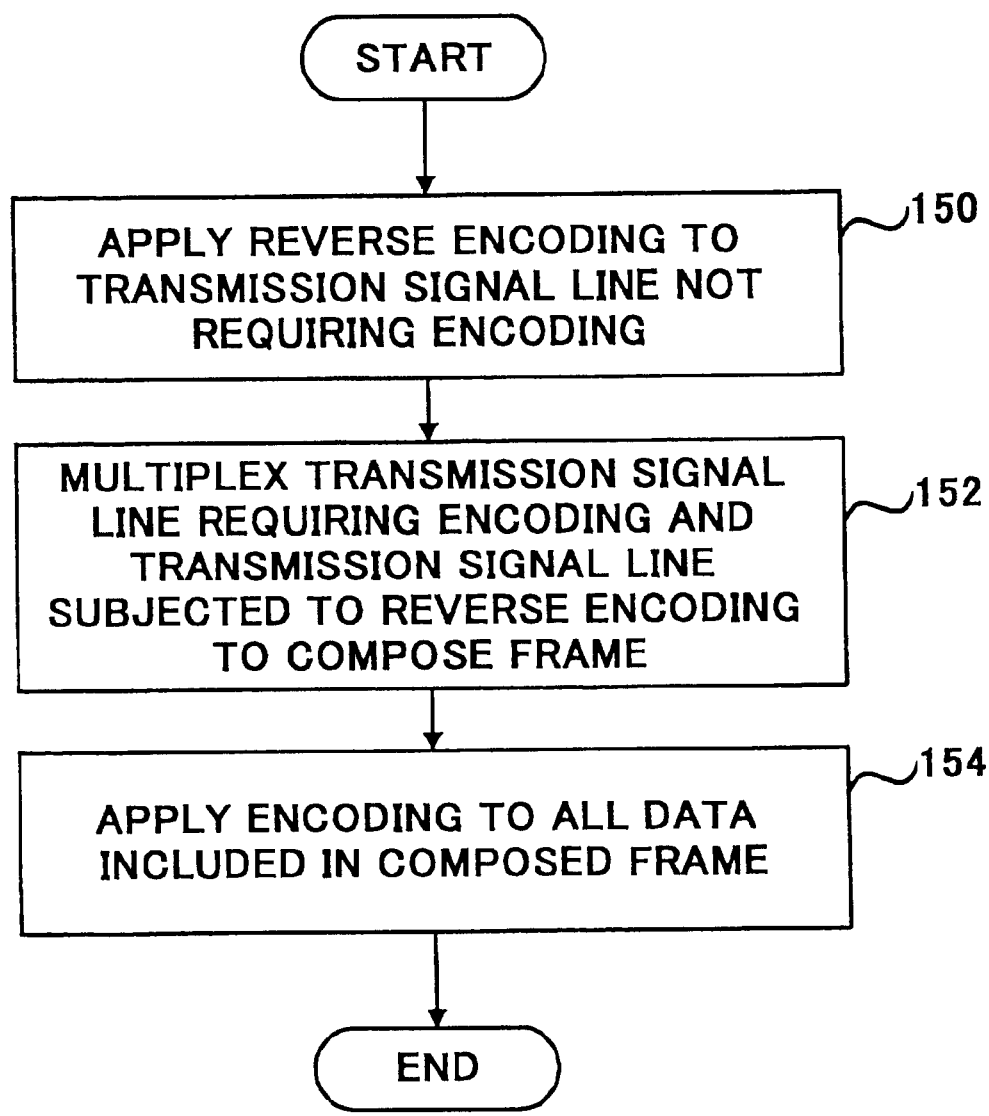
FIG. 5 is a flow chart showing a characteristic operation of STTD encoding processing of the present invention.

FIG. 5 summarizes the characteristic operations of the STTD encoding method of the present invention explained above.

That is, a transmission signal line that requires no STTD encoding is subjected to reverse encoding (step 150).

Then, a transmission signal line requiring STTD encoding is time-multiplexed with a transmission signal line subjected to reverse STTD encoding to compose a transmission frame (step 152).

Then, STTD encoding is applied to all data included in the composed transmission frame (step 154).

As described above, the present invention does not require provision of two multiplexers. It also eliminates the need to determine whether STTD encoding is necessary or not inside the STTD encoder or change the processing content.

Thus, the present invention can reduce the size of the circuit to perform STTD encoding.

It also improves the degree of freedom in constructing a transmission system and attains energy saving and cost reduction of the base station system.

The present invention is not limited to the above described embodiments, and various variations and modifications may be possible without departing from the scope of the present invention. This invention is also applicable to STTD encoding of data pertinent to another communication channel.

This application is based on the Japanese Patent Application No.2000-080384 filed on Mar. 22, 2000, entire content of which is expressly incorporated by reference herein.

What is claimed is:

1. An STTD (Space time block coding based transmit antenna diversity) encoding method to implement transmission diversity comprising the steps of:

performing reverse STTD encoding on transmission data not requiring STTD encoding;

time-multiplexing transmission data requiring STTD encoding and transmission data subjected to reverse STTD encoding to create a transmission frame; and performing STTD encoding on all data included in the created transmission frame.

2. The STTD encoding method according to claim 1, wherein said step of performing reverse STTD encoding directly outputs, if two adjacent QPSK symbols are S1 and S2, said symbols S1 and S2 as signals corresponding to one transmission antenna and creates and outputs S3 and S4, which have a relationship of S3=S2* and S4=−S1* (here, "*" denotes a relationship between conjugate complex numbers) as the signals corresponding to the other transmission antenna, said step of performing STTD encoding directly outputs, if two adjacent QPSK symbols are S5 and S6, said symbols S5 and S6 as signals corresponding to one transmission antenna and creates and outputs S7 and S8, which have a relationship of S7=−S6* and S8=−S5* as the signals corresponding to the other transmission antenna.

3. The STTD encoding method according to claim 1, wherein said reverse STTD encoding is performed on a pilot symbol.

4. A method of composing a transmission frame of a dedicated downlink physical channel (Downlink Dedicated Physical Channel: Downlink DPCH) in a CDMA communication comprising the steps of:

performing reverse STTD encoding on a pilot signal (Pilot);

performing channel encoding processing, rate matching processing and interleaving processing on transmission data sequentially; and time-multiplexing the transmission data subjected to said processing, transmit power control information (TPC), transmission format information (TFCI) and pilot signal (Pilot) subjected to said reverse STTD encoding to compose a dedicated downlink physical channel transmission frame.

5. A diversity transmitter that carries out diversity transmission using a first antenna and a second antenna comprising:

a reverse STTD encoder that applies reverse STTD encoding to transmission data not requiring STTD encoding;

a multiplexer that time-multiplexes transmission data requiring STTD encoding and transmission data subjected to reverse STTD encoding to compose a transmission frame; and an STTD encoder that applies STTD encoding to all data included in the composed transmission frame and outputs a first transmission signal line to be sent from said first antenna and a second transmission signal line to be sent from said second antenna.

6. The diversity transmitter according to claim 5, wherein said reverse STTD encoder directly outputs, when adjacent QPSK symbols S1 and S2 are input, said symbols S1 and S2 as the signals corresponding to said first antenna and creates and outputs S3 and S4, which have a relationship of S3=S2* and S4=−S1* (here "*" denotes a relationship of conjugate complex numbers) as the signal corresponding to said second antenna, said STTD encoder directly outputs, when adjacent QPSK symbols S5 and S6 are input, said symbols S5 and S6 as the signals corresponding to said first antenna and creates and outputs S7 and S8, which have a relationship of S7=−S6* and S8=S5* as the transmission signal corresponding to said second antenna.

7. The diversity transmitter according to claim 5, wherein a pilot signal is input to said reverse STTD encoder.

8. A base station apparatus based on a CDMA communication system comprising the diversity transmitter according to claim 5.

9. A diversity transmission method that performs diversity transmission of information pertinent to a dedicated downlink physical channel (Downlink Dedicated Physical Channel: Downlink DPCH) in open-loop mode from a base station apparatus based on a CDMA communication system having a first and second antennas to a mobile station, comprising the steps of:

performing reverse STTD encoding on a pilot signal (Pilot);

performing channel encoding processing, rate matching processing and interleaving processing on transmission data sequentially;

time-multiplexing the transmission data subjected to said processing, transmit power control information (TPC), transmission format information (TFCI) and pilot signal (Pilot) subjected to said reverse STTD encoding to compose a dedicated downlink physical channel transmission frame;

applying STTD encoding to all data included in the composed transmission frame and obtaining a first transmission signal line to be sent from said first antenna and a second transmission signal line to be sent from said second antenna;

multiplying said first and second transmission signal lines obtained as a result of STTD encoding by their respective predetermined codes; and transmitting said first transmission signal line from said first antenna and said second transmission signal line from said second antenna.

10. The STTD encoding method according to claim 2, wherein said reverse STTD encoding is performed on a pilot symbol.

* * * * *